United States Patent
Kawano et al.

(10) Patent No.: US 6,606,696 B1
(45) Date of Patent: Aug. 12, 2003

(54) VIRTUAL STORAGE ADDRESS SPACE ACCESS CONTROL

(75) Inventors: Hiroshi Kawano, Kawasaki (JP); Aiichiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/461,293

(22) Filed: Dec. 15, 1999

(30) Foreign Application Priority Data

Dec. 16, 1998 (JP) .......................................... 10-357929

(51) Int. Cl.[7] .............................................. G06F 12/10
(52) U.S. Cl. ...................................................... 711/206
(58) Field of Search ................................. 711/1, 6, 100, 711/205–209, 214–215, 221, 210

(56) References Cited

U.S. PATENT DOCUMENTS

| | | | | |
|---|---|---|---|---|
| 4,355,355 A | * | 10/1982 | Butwell et al. | 711/208 |
| 5,305,458 A | * | 4/1994 | Motomura et al. | 711/207 |
| 5,479,631 A | * | 12/1995 | Manners et al. | 711/138 |
| 5,923,864 A | | 7/1999 | Inoue | 711/205 |

FOREIGN PATENT DOCUMENTS

| | | |
|---|---|---|
| JP | 3-57046 | 3/1991 |
| JP | 4-361341 | 12/1992 |
| JP | 5-143462 | 6/1993 |
| JP | 6-202955 | 7/1994 |

OTHER PUBLICATIONS

IBM technical Disclosure Bulletin, "Hardware Assist to Execute the STAM ESA/390 Instruction," Aug. 1992, vol. 35, pp. 68–69.*

* cited by examiner

*Primary Examiner*—Matthew Kim
*Assistant Examiner*—Denise Tran
(74) *Attorney, Agent, or Firm*—Staas & Halsey LLP

(57) ABSTRACT

An AR map has entries of the same number as the AR's and is accessed by an ARN. In each of the map entries, there are entered: an ID of a pertinent entry in an STD array; and a flag representing valid or invalid of the map entry. Into an ALET holding part, there are stored ALET's corresponding to STD's in the STD array, respectively. Upon AR access, if an entry in the AR map which corresponds to a designated AR is valid, an ID included in the valid entry is outputted to a storage controlling part. In case that the corresponding entry in the AR map is invalid, if the ALET holding part stores an ALET identical with an ALET of the designated AR, an ID of STD corresponding to the stored ALET is stored into the AR map.

14 Claims, 15 Drawing Sheets

VIRTUAL STORAGE ADDRESS SPACE ACCESS CONTROL

BACKGROUND OF THE INVENTION

1. Field of the Invention

The present invention relates to virtual storage address space access control for referring to data on an arbitrary virtual address space in an information processor having a virtual storage unit which provides a plurality of virtual address spaces in a physical address space, and specifically relates to determination of a segment table to be used for translating a virtual address designated by an application program into a physical address, based on an access register (AR) designated by the application program, in virtual storage address space access control.

A recent demand on an information processing system is to increase the amount of data to be processed. This is particularly remarkable in a database system. Due to this demand, there is required an architecture which enables a user program to directly access data in a plurality of address spaces, beyond a limitation of an address space in a conventional virtual storage unit. In such a case, it is desired-to improve performance and to simplify circuitry, because of the complexity of the process for translating a virtual address designated by a user program into a physical address.

2. Description of the Related Art

Systems capable of referring to a plurality of virtual address spaces from a user program as mentioned above, include a system utilizing an access register (hereinafter abbreviated to "AR"). In a system which extends an accessible address space utilizing such an AR, one of a plurality of AR's (e.g., sixteen AR's from AR0 to AR15) is designated by an instruction by which a user program accesses a memory. There is then taken out an access list entry token (hereinafter called "ALET") from the designated AR, and there is decided a segment table designation (hereinafter abbreviated to "STD") based on the ALET, via processing of access register translation (hereinafter abbreviated to "ART"). The STD designates one of segment tables and, similarly to the conventional method, a logical address in a virtual space is translated into an actual address, making use of the segment table via processing of dynamic address translation (hereinafter abbreviated to "DAT"). An application program is allowed to access to a plurality of address spaces, making use of a plurality of AR's.

Since the above processing of ART requires a long period of time for processing, there can be adopted a two stage-type of ART index buffering mechanism to thereby shorten an effective processing time (e.g., refer to Japanese Unexamined Patent Publication (Kokai) No. 3-57046). The second stage of the buffering mechanism is called an ART look-up buffer (ALB). In the present specification, the first stage buffering mechanism is called an STD array.

In the above described prior art, entries in an STD array (this array is called "first ALB" in the aforementioned Publication) include STD's corresponding to AR's, respectively, and each of these entries is accessed by an AR number (ARN). When an STD corresponding to the designated AR is validly stored in the STD array, the intended STD can be taken out immediately. When an STD corresponding to the designated AR is not validly stored in the STD array, then the ALB is looked up. Each entry in the ALB includes an ALET and an STD paired with and translated from the ALET, so that an STD can be obtained by retrieving an entry which corresponds to an ALET of the designated AR. The thus obtained STD is entered into the STD array. Only when the designated AR does not hit the ALB, is there performed a calculation for translating the ALET into the STD and the thus obtained STD is entered into both of the ALB and STD array.

In the above prior art, the fact-that each entry in the. STD array is accessed by an ARN means that fixed one-to-one correspondences are previously set between the AR's and the entries in the STD array, respectively. Therefore, there are required as many STD storing areas as there are AR's. For example, sixteen STD storing areas are required when sixteen AR's are used.

Meanwhile, it is probable that an actually adopted user application accesses the same space using some different AR's, i.e., a plurality of AR's correspond to the same STD. This means that entries in an STD array are used in an excessive number more than really required. Should an STD array be prepared in an excessive size for such an application, there is caused such a problem that a circuit scale is increased as compared to a situation where the array is prepared in a required minimum size, and that a circuit delay is thus increased.

In case of providing STD storing areas only in a required number (e.g., four) in an STD array, there is required some mechanism for indicating a relationship between the AR's and the entries of STD array. As a technique therefor, it might be envisaged that ALET's corresponding to respective STD entries are stored in a manner related to the STD's, to thereby obtain an STD related to an ALET coinciding with an ALET of a designated AR. However, it is then required to compare the ALET of the designated AR with the stored ALET's at each access, and this becomes a bottleneck in shortening a machine cycle.

SUMMARY OF THE INVENTION

It is therefore an object of the present invention to provide a method for swiftly determining an STD which corresponds to a designated AR, making use of a small sized circuit.

According to the present invention, there is provided a virtual storage address space access control method of determining a segment table to be used for accessing to the virtual address space, based on a designated AR (access register), the method comprising the steps of: dynamically storing correspondences between AR's and STD's (segment table designations) stored in an STD array, into an AR map; and determining an STD which corresponds to a designated AR, making use of the correspondences stored in the AR map.

It is preferable that said method further comprises the step of: storing copies of ALET's (access list entry tokens) which correspond to respective STD's stored in the STD array; wherein said dynamically storing step includes the substep of: comparing an ALET of the designated AR with each of the copies of ALET's; storing an STD determined from the ALET of the designated AR, in the STD array, when the ALET of the designated AR coincides with none of the copies of ALET's; and storing a correspondence between the designated AR and an STD corresponding to a copy of an ALET which coincides with the ALET of the designated AR, into the AR map.

According to the present invention, there is also provided a virtual storage address space access control apparatus for determining a segment table to be used for accessing the virtual address space, based on a designated AR, comprising: an AR map capable of dynamically storing correspondences between AR's and STD's stored in an STD array; and an access control circuit determining an STD which corresponds to a designated AR, making use of the correspondences stored in the AR map.

It is preferable that said apparatus further comprises: a memory storing copies of ALET'S which correspond to respective STD's stored in the STD array; wherein said access control circuit includes: a comparator comparing an ALET of the designated AR with each of the copies of ALET's; an STD array control circuit storing-an STD determined from the ALET of the designated AR, in the STD array, when the ALET of the designated AR coincides with none of the copies of ALET's; and AR map control circuit storing a correspondence between the designated AR and an STD corresponding to a copy of an ALET which coincides with the ALET of the designated AR, into the AR map.

DESCRIPTION OF THE PREFERRED EMBODIMENTS

Figure 1:
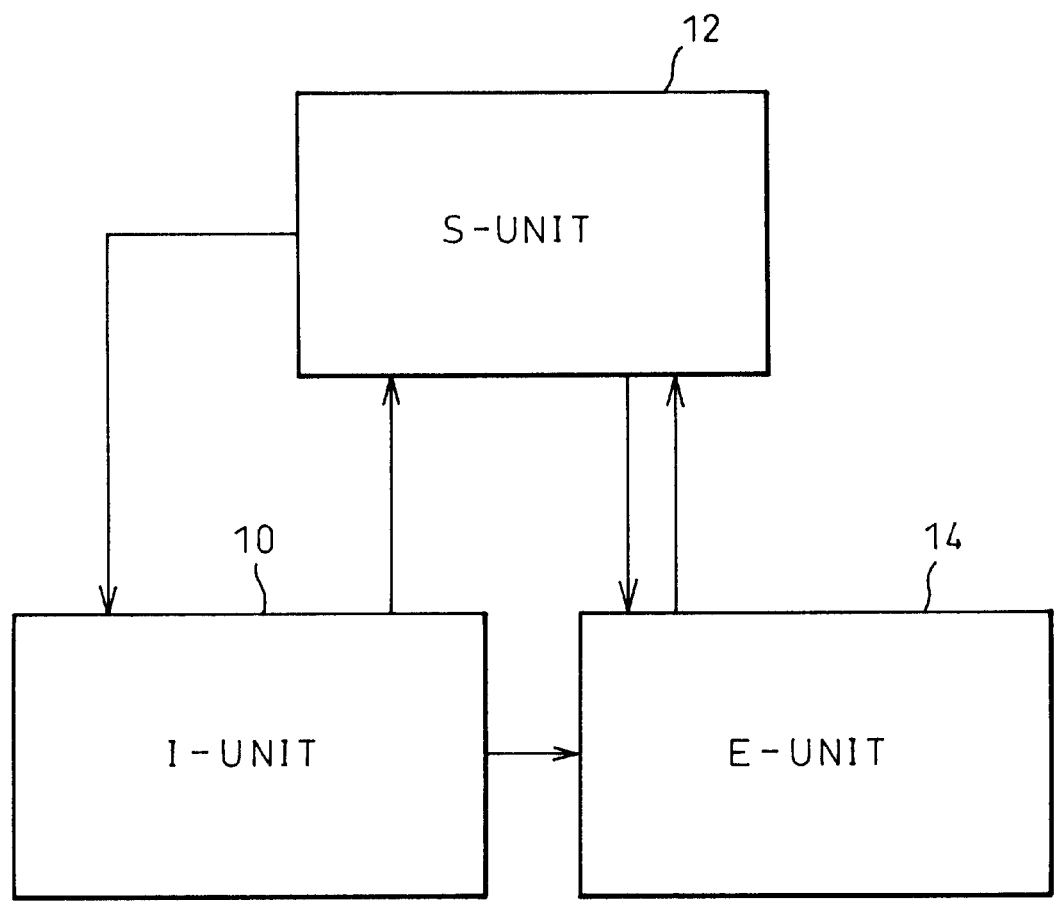
FIG. 1 is a block diagram showing a schematic constitution of a large-size general-purpose machine to which the present invention can be applied.

FIG. 1 shows a schematic constitution of a large sized general-purpose machine to which the present invention is preferably applied. In FIG. 1, instruction controlling part 10 receives an instruction from a storage controlling part 12 and decodes the same to thereby instruct a calculator 14 to execute the instruction. When an AR mode has been set and an operand of the instruction includes a memory operand, the instruction controlling part 10 determines an STD based on an ARN designated in the operand, and instructs the storage controlling part 12 to translate a virtual address into an actual address, based on the determined STD.

Figure 2:
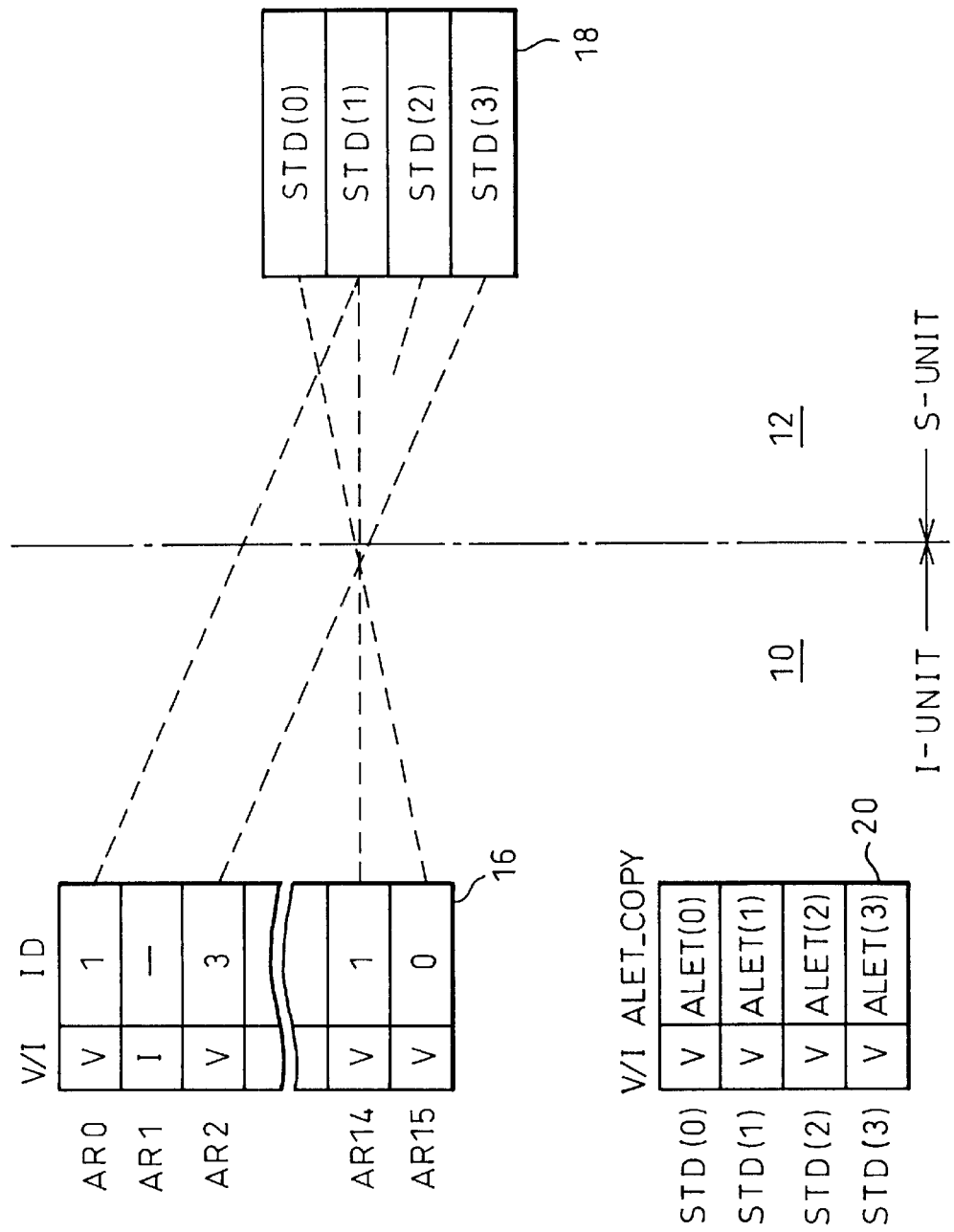
FIG. 2 is a view for explaining a concept of the present invention.

FIG. 2 is a view for explaining a concept of the present invention.

In the description hereinafter, the number of AR's is supposed to be 16, and the maximum number of STD's which can be stored in an STD array is supposed to be 4. However, the present invention is not limited thereto. Preferably, the number of AR's>the maximum number of STD's.

In FIG. 2, each entry of AR map 16 includes a flag indicating valid/invalid (V/I) of the entry and an identifier (ID) indicating an entry in an STD array 18. This map 16 is accessed by an ARN (N=0 to 15). In the example shown, AR2 corresponds to STD(3) in the STD array 18, and AR15 corresponds to STD(0). Both of AR0 and AR14 correspond to STD(1). AR1 has not been used by a user application. ALET holding part 20 includes copies of ALET's corresponding to entries in the STD array 18, respectively, and flags indicating valid/invalid of the entries.

When a memory operand is included in an instruction in an AR mode, the instruction controlling part 10 firstly accesses the AR map 16 using the ARN to thereby check the valid/invalid flag, and if valid, outputs its ID to the storage controlling part 12. The storage controlling part 12 in turn takes out an STD designated by the instruction controlling part 10 from the STD array 18, and translates a relevant virtual address into an actual address, making use of a segment table determined by the thus taken out STD.

When that entry of AR map 16 which corresponds to the ARN is invalid, an ALET which is the content of the AR designated by the ARN is taken out from the AR and compared with all of the ALET shield in the ALET holding part 20. If the taken out ALET coincides with one of the held ALET'S, the ID of the corresponding ALET (if the taken out ALET corresponds to ALET(2), the ID is "2") is entered into the AR map, its flag is set to be "valid", and the AR map 16 is accessed again. In this situation, the access must be successful.

When none of the ALET's in the ALET holding part 20 coincides with the taken out ALET, there is obtained an STD making use of a buffering mechanism based on a known ALB (not shown), and the thus obtained STD and an ALET therefor are entered into the STD array 18 and the ALET holding part 20, respectively. Then, comparison of the ALET's is performed again, entering into the AR map 16 is performed, and the AR map 16 is accessed again. Meanwhile, failing a hit even in the ALB, there is performed a calculation for translating the ALET into an STD, the results thereof are entered into the ALB, STD array 18 and ALET holding part 20, respectively, comparison of the ALET's is performed, storage into the AR map 16 is performed, and the AR map 16 is accessed again. It is noted that the buffering mechanism based on the ALB may be omitted.

As described above, even when that entry of the AR map 16 which is accessed by the designated ARN is invalid, the ALET of the ARN should coincide with any one of the ALET's held in the ALET holding part 20 if the ALET of the ARN corresponding to any one of the STD's which have been already registered in the STD array 18. Thus, it is possible to addingly or superposingly relate an entry to the stored STD without entering a new STD (in the example shown, AR0 and AR14 are related to the STD(1), coincidentally with each other).

In this way, according to the present invention, in a situation that an application program accesses one and the same space via a plurality of AR's, a plurality of AR's are multiplexedly related to one entry of the STD array, so that the STD array need not to have a volume capable of storing STD's of the same number with the AR's Note, when it is required to enter a new STD under a condition that the STD array 18 has been filled with different STD's, the new STD is overwritten onto an STD which has been registered most formerly, as will be described later. At this time, there are invalidated those entries in the AR map which correspond to the STD before overwriting. Without being limited to the above, it is also possible to overwrite a new STD onto an STD which has not been used for the longest period of time. Further, also by an instruction which updates an AR, the entry relating to the AR is invalidated.

Figure 3:
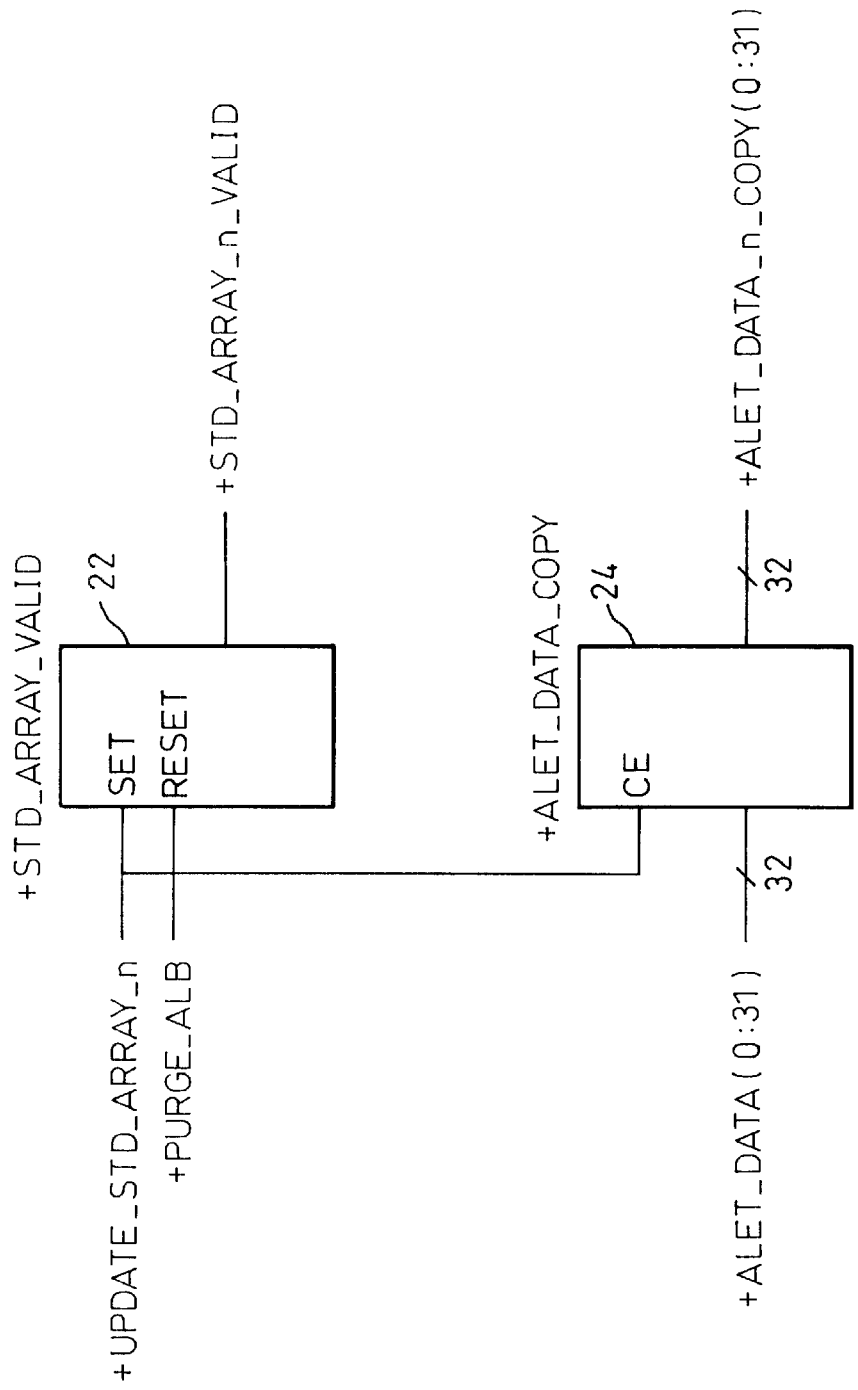
FIG. 3 is a circuit diagram showing an example of a circuit for entering into an ALET holding part and STD array.

FIG. 3 shows an example of a circuit for realizing a storing area for one entry in the ALET holding part 20 shown in FIG. 2; and a line connection for updating an entry in the ALET holding part 20 in entering a new STD into the STD array 18. Note, in this figure and figures subsequent thereto, variable "x" (x=0 to 15) represents an ARN (access register number), and variable "n" (n=0 to 3) represents an identifier of each of the entries in the ALET holding part 20 and STD array 18.

In FIG. 3, flip-flop 22 holds a flag indicating valid/invalid of the n-th (n=0 to 3) entries in the ALET holding part 20 and STD array 18 (see FIG. 2). Latch 24 holds an n-th ALET to be held in the ALET holding part 20. The whole of the ALET holding part 20 is realized by four pairs of flip-flops 22 and latches 24.

When initialized, such as by a power on, all of the entries in the STD array are invalid, and all of the STD_ARRAY_n_VALID's represent invalid. When an STD corresponding to a designated AR is determined by other means under this condition, UPDATE_STD_ARRAY_n becomes active to thereby set the flip-flop 22 so that an ALET of the designated AR is latched to the latch 24 to thereby enter an nth entry. Entering of an STD into the STD array 18 is performed at the storage controlling part 12.

Figure 4:
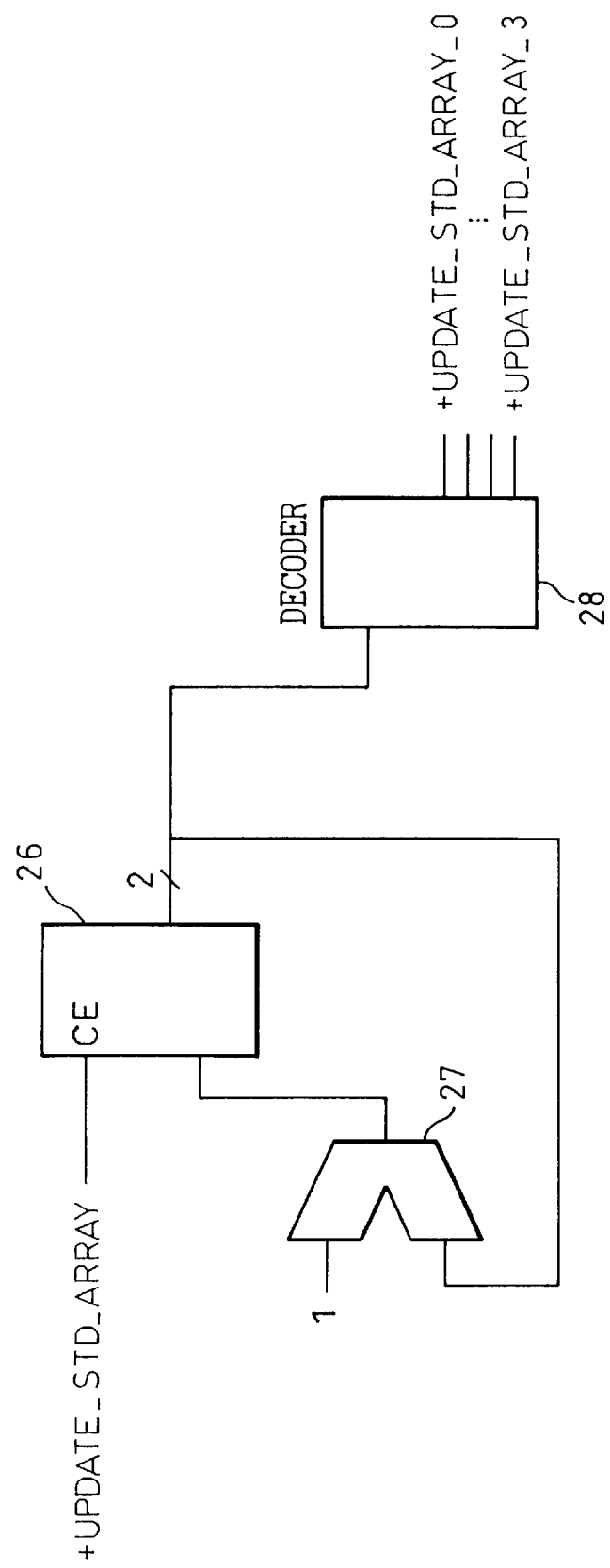
FIG. 4 is a circuit diagram showing an example of a circuit for determining a storage location in the STD array.

FIG. 4 shows an example of a circuit for determining "n", in entering an STD into the STD array. Connected to one input of an adder 27 is an output of a latch 26, and a constant "1" is inputted into the other input of adder 27. Thus, the value represented by 2 bits outputted by the latch 26 changes in an order of 0→1→2→3→0 each time an STD to be newly entered is determined. The output of 2 bits of the latch 26 is decoded by a decoder 28 which outputs update signals UPDATE_STD_ARRAY_n for respective entries. The update signal UPDATE_STD_ARRAY is turned ON, each time an STD is determined by other means' (ALB and ART calculation): in a state that all of the entries in the STD array are invalid; or, in a state that an STD corresponding to a designated AR is not entered in the STD array. Each time the UPDATE_STD_ARRAY becomes ON, the output of the latch 26 is incremented, and the entries in the STD array and ALET holding part are updated in an order of 0→1→2→3→0. Namely, when the STD array has become full, the oldest entry is updated. In this embodiment, when a new address space is to be used under a situation that a user application uses address spaces of the number more than the capacity (four [4] in this embodiment) of the STD array, an STD of address space, the usage of which has been most formerly started, is overwritten.

Figure 5:
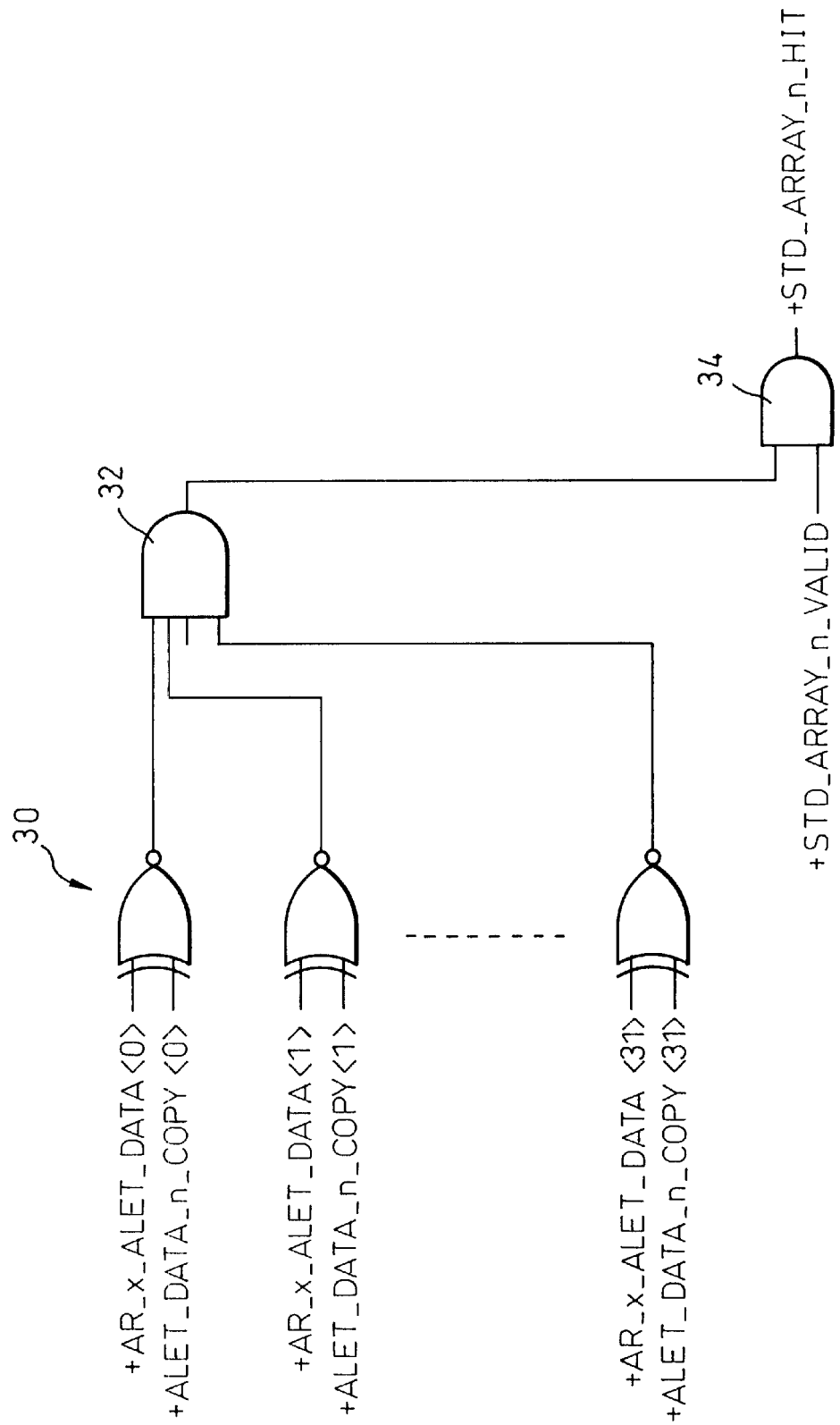
FIG. 5 is a circuit diagram showing an example of a comparison circuit for comparing ALET's.

FIG. 5 shows an example of a comparison circuit which judges whether an STD corresponding to a user's designated AR is entered in the STD array or not, when an ID of the STD corresponding to the user's designated AR is not stored in the AR map. In case that "n" is 0 to 3, such a comparison circuit is provided in four groups as a whole. The thirty two (32) pieces of ENOR circuits 30 compare the bits of AR_x_ALET_DATA (0:31) to be readout from the designated AR with the bits ALET_DATA_n_COPY (0:31) outputted by the ALET holding circuit, respectively. When all of the respective bits coincide with each other, output of an AND circuit 32 becomes active. Further, when a copy of nth ALET and the n-th STD in the STD array are valid, an output of an AND circuit 34 becomes active. This means that the ALET of the x-th AR designated by the user program corresponds to the n-th STD in the STD array.

Figure 6:
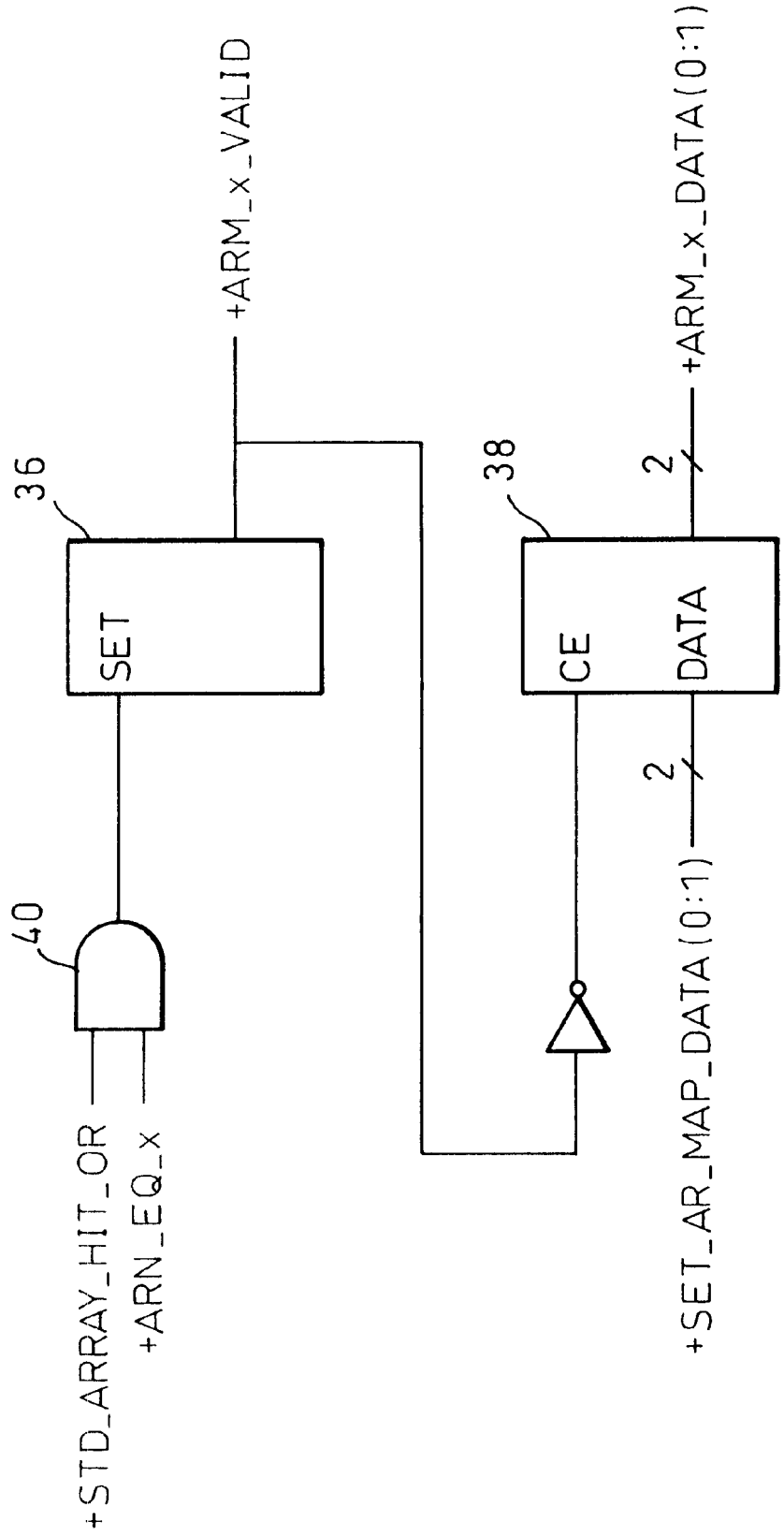
FIG. 6 is a circuit diagram showing an example of an AR map and a circuit for entering into the AR map.

FIG. 6 shows an example of a circuit which, when the ALET of the x-th AR designated by the user program corresponds to the n-th STD, enters such a correspondence into the AR map 16. In FIG. 6, there is realized a storing area of one entry in the AR map 16, by a flip-flop 36 and a latch 38. The whole of the AR map 16 (FIG. 2) is realized by sixteen (16) sets of the flip-flops 36 and latches 38.

Signal STD_ARRAY_HIT_OR to be inputted into one input of an AND circuit 40 is a logical OR of STD_ARRAY—n_HIT's of FIG. 5 over n=0 to 3. Output of the AND circuit 40 becomes active, when an STD corresponding to an AR designated by the user application has already been entered in the STD array and the flip-flop 36 and latch 38 shown in FIG. 6 relate to the designated AR. When the output of AND circuit 40 becomes active, the flip-flop 36 is set so that the pertinent entry of the AR map becomes valid, and the latch 38 is latched with an ID of the corresponding STD(n) (n=0 to 3). Inputted into an input of the latch 38 is +SET_AR_MAP_DATA (0:1) which is obtained by encoding the four signal lines of STD_ARRAY_n—HIT's shown in FIG. 5 into 2 bits.

Figure 7:
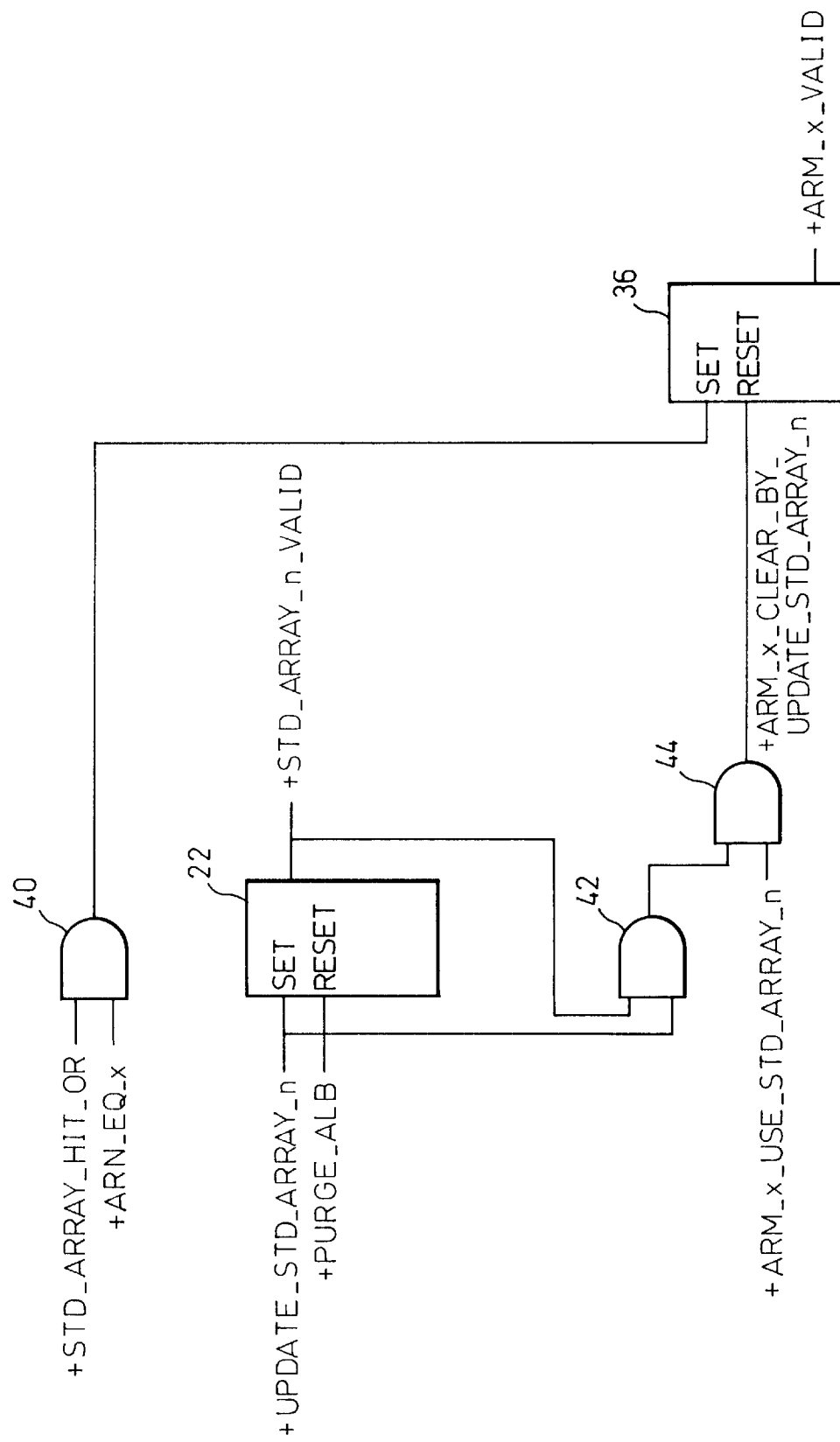
FIG. 7 is a circuit diagram showing an example of a circuit for invalidating a corresponding entry in an AR map at the time of overwriting of entry in the STD array.

FIG. 7 shows an example of a circuit for invalidating an x-th entry in the AR map which entry corresponds to an n-th entry of the STD array, when the n-th entry of the STD array is overwritten. Constituent elements identical with those in FIG. 6 are designated by identical reference numerals, respectively. Two inputs of an AND circuit 42 are connected to an input and an output of the flip-flop 22, respectively, which holds the flag representing invalid/valid of the pertinent entry of the STD array. When the n-th entry in the STD array is to be updated, the output side of the flip-flop 22 is already. ON before updating . Upon becoming ON of the input side, the output of the AND circuit 42 becomes. ON, to thereby represent that the n-th entry of the STD array is being updated. This representing signal is ANDed by an AND circuit 44 with a signal ARM_x_USE_STD_ARRAY_n which represents that an x-th entry in the AR map uses an n-th entry in the STD array, and the result thereof resets the flip-flop 36 which holds a flag representing valid/invalid of the x-th entry in the AR map Note, the signal ARM_x_USE_STD_ARRAY_n can be generated by ANDing each of signals obtained by decoding the +ARM_x_DATA (0:1) shown in FIG. 6 and +ARM_x_VALID.

Figure 8:
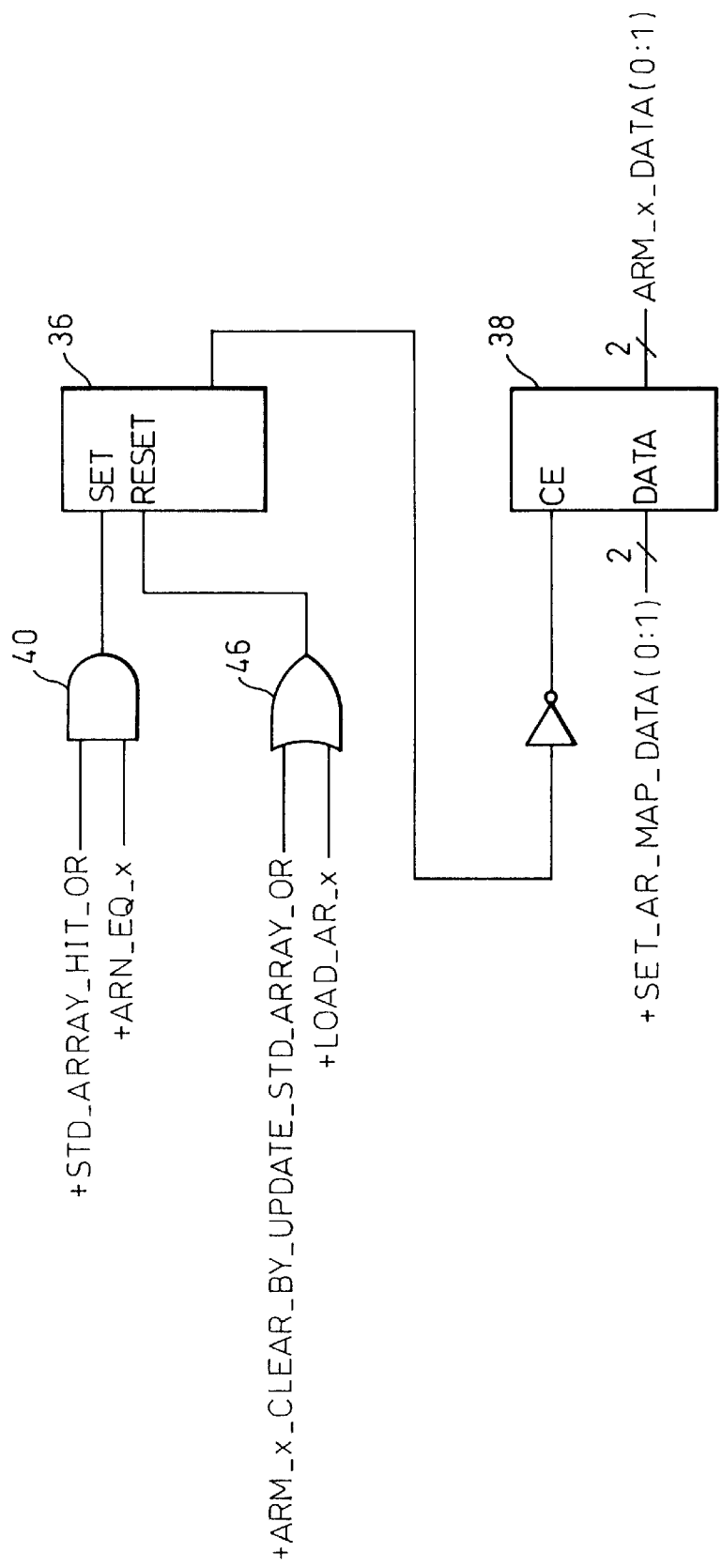
FIG. 8 is a circuit diagram showing an example of a circuit for invalidating a corresponding entry in an AR map at the time of executing an instruction for rewriting an AR.

FIG. 8 shows an example of a circuit for invalidating a corresponding entry in an AR map when a content of the AR is rewritten by an instruction CPYA (copy between AR's), etc. Constituent elements identical with those in FIG. 6 are designated by identical reference numerals, respectively. Signal +ARM_x_CLEAR_BY_UPDATE_STD_ARRAY_OR to be inputted into one input of an OR circuit 46 is obtained by ORing the output of the AND circuit 44 in FIG. 7 over all of "n", and this signal +ARM_x_CLEAR_BY_UPDATE_STD_ARRAY_OR represents an invalidating request for an x-th entry in the AR map caused by overwriting of anyone of the entries in the STD array. Signal +LOAD_AR_x to be inputted into another input of the OR circuit 46 represents that a new value is loaded into an x-th AR. By this signal, there is reset the flip-flop 36 which holds the flag representing valid/invalid of the x-th entry in the AR map. When a user application later accesses a virtual space making use of an updated AR, the latch 38 holding an ID of the pertinent entry is latched with a new value, so that the instruction itself for updating the content of AR is processed at a higher speed.

Instructions for updating AR include an LAM instruction instructing transference of a plurality of data from a memory into a plurality of AR's, respectively. By this instruction, that AR, which the instruction itself uses for memory access, may be subjected to update. Therefore, in the circuit of FIG. 8 in this situation, when that AR, which the LAM instruction uses for memory access, is rewritten by execution of the LAM instruction, the +LOAD_AR_x to be inputted into the OR circuit 46 becomes active to thereby reset the flip-flop 36 so that the output of the latch 38 is rewritten, resulting in the subsequent data to be loaded into the AR can not be accessed any more. Thus, there is required some mechanism for holding the output of the latch 38, during the execution of LAM. Note, even when the output of the flip-flop 36, representing the pertinent entry in the AR map, is reset, this output is not used until a memory access is performed by an instruction after LAM, so that no problems are caused.

Figure 9:
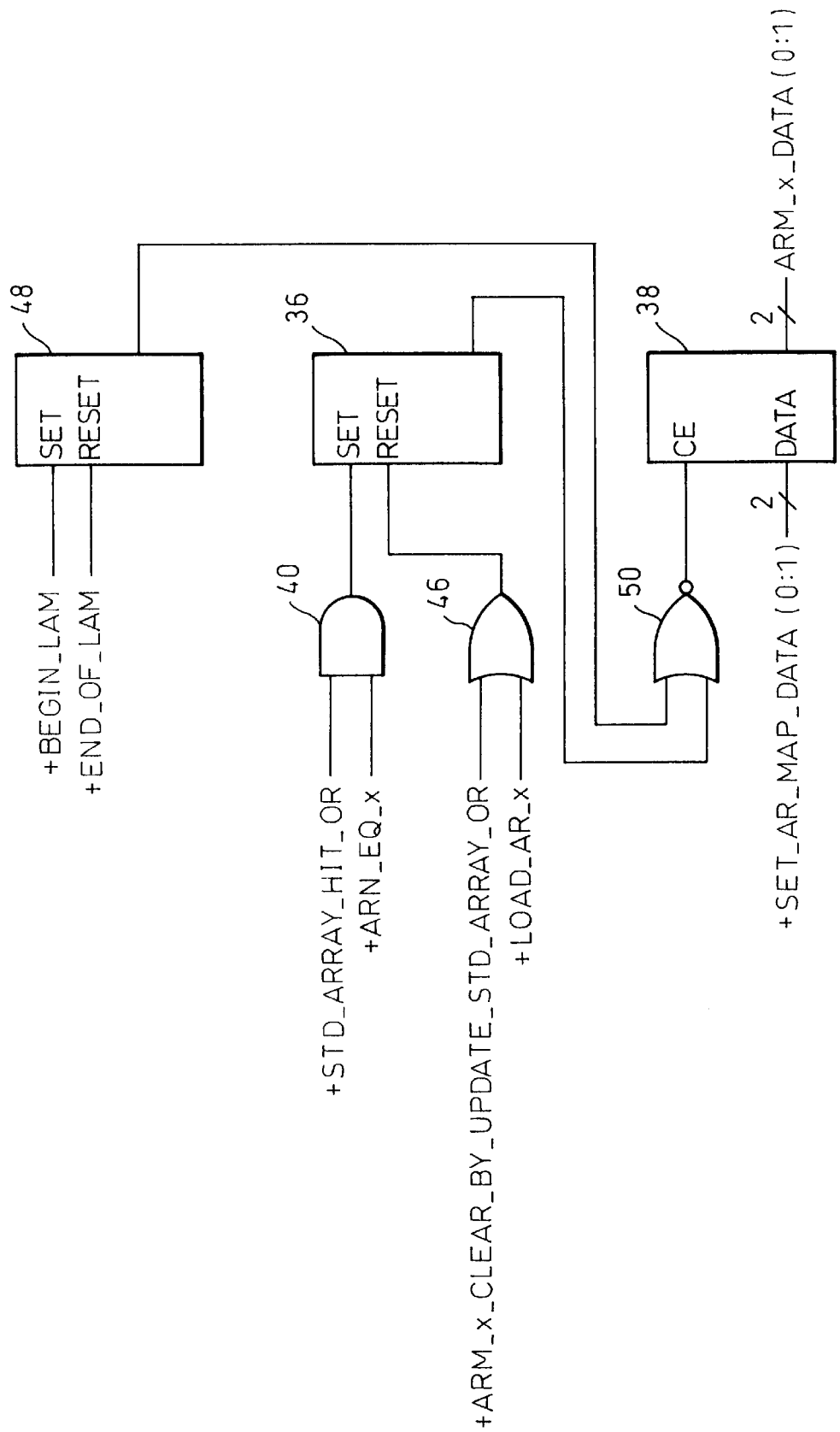
FIG. 9 is a circuit diagram showing an example of a circuit for holding a content of the AR map until termination of an execution of an LAM instruction, in executing the LAM instruction.

FIG. 9 shows an example of a circuit in which the circuit of FIG. 8 is added with a mechanism for holding the output of the latch 38 during execution of the LAM instruction. Flip-flop 48 is set by starting of the LAM instruction, and is reset by termination thereof. During a set state of the flip-flop 48, an output of NOR circuit 50 is kept at an L level even if the flip-flop 36 is reset. Thus, a clock enable terminal of the latch 38 is kept at an L level, so that those data to be transferred can be successively obtained from the same address space.

In the circuit of FIG. 9, since the output of the latch 38, i.e., the ID stored in the AR map, is held during execution of LAM, updating of the AR map is not possible even if an STD corresponding to AR rewritten by the LAM instruction has been entered in the STD array.

Figure 10:
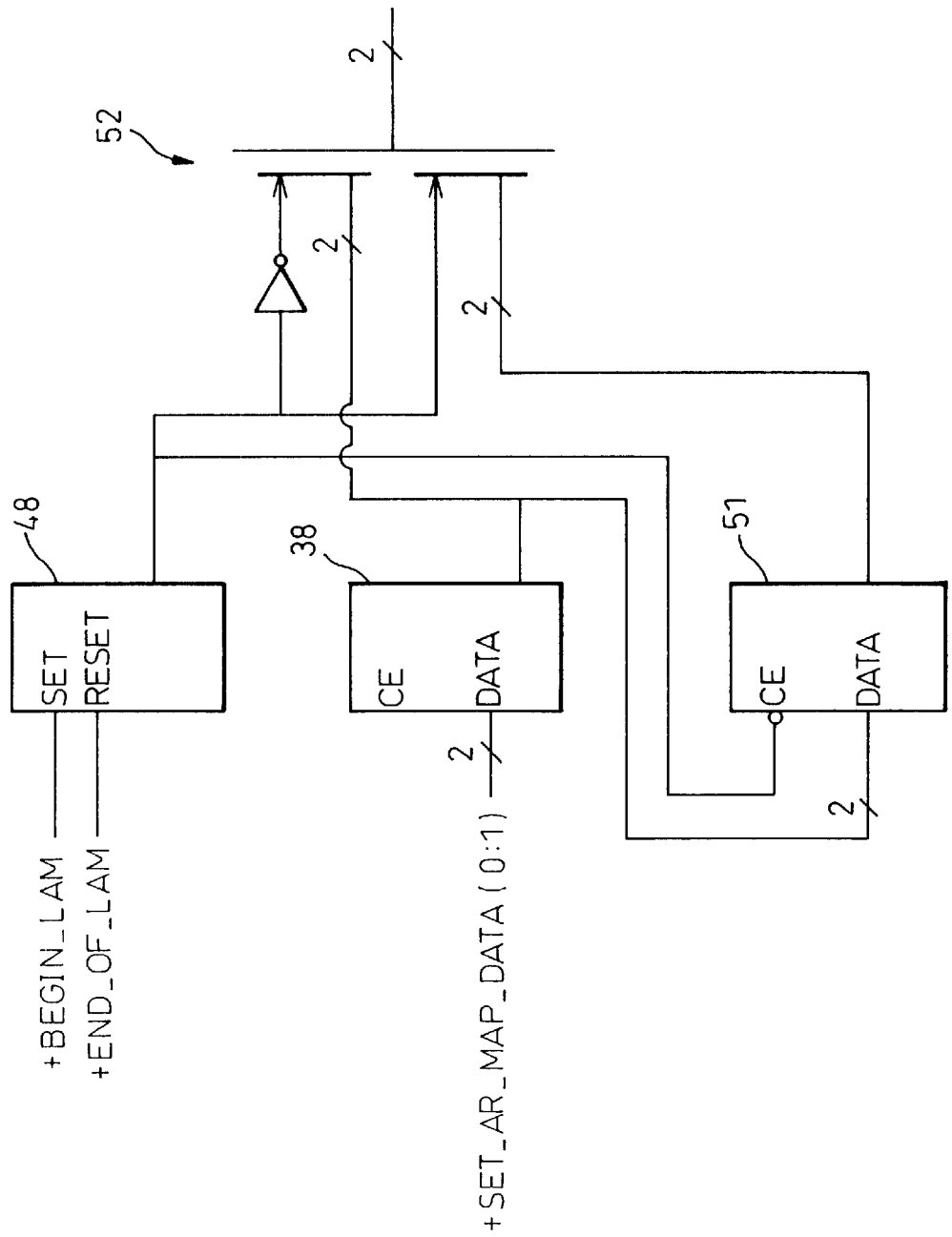
FIG. 10 is a circuit diagram showing an example of a circuit for holding a content of the AR map at a place other than the AR map, until termination of an execution of an LAM instruction, in executing the LAM instruction.

FIG. 10 shows a circuit which improves this point such that updating of the AR map even during execution of LAM is permitted to thereby allow further acceleration.

Flip flop 51 latches the output of the latch 38, at the time of starting of the LAM instruction. Selector 52 selects and outputs the output of the latch 38 during a period of time other than execution of the LAM instruction, and selects and outputs the output of the flip-flop 51 during a period of time of execution of LAM. By two bits outputted by the selector, there is selected an entry of the STD array 18 of the storage controlling part 12 According to this constitution, the ID of STD to be given to the storage controlling part 12 is unchanged during execution of LAM, so that those data to be loaded into the AR can be accessed, and updating of the AR map is possible even during execution of LAM instruction. Thus, if an STD corresponding an AR updated by the LAM instruction has been already stored in the STD array, updating of the AR map is possible simultaneously with the execution of LAM instruction.

Figure 11:
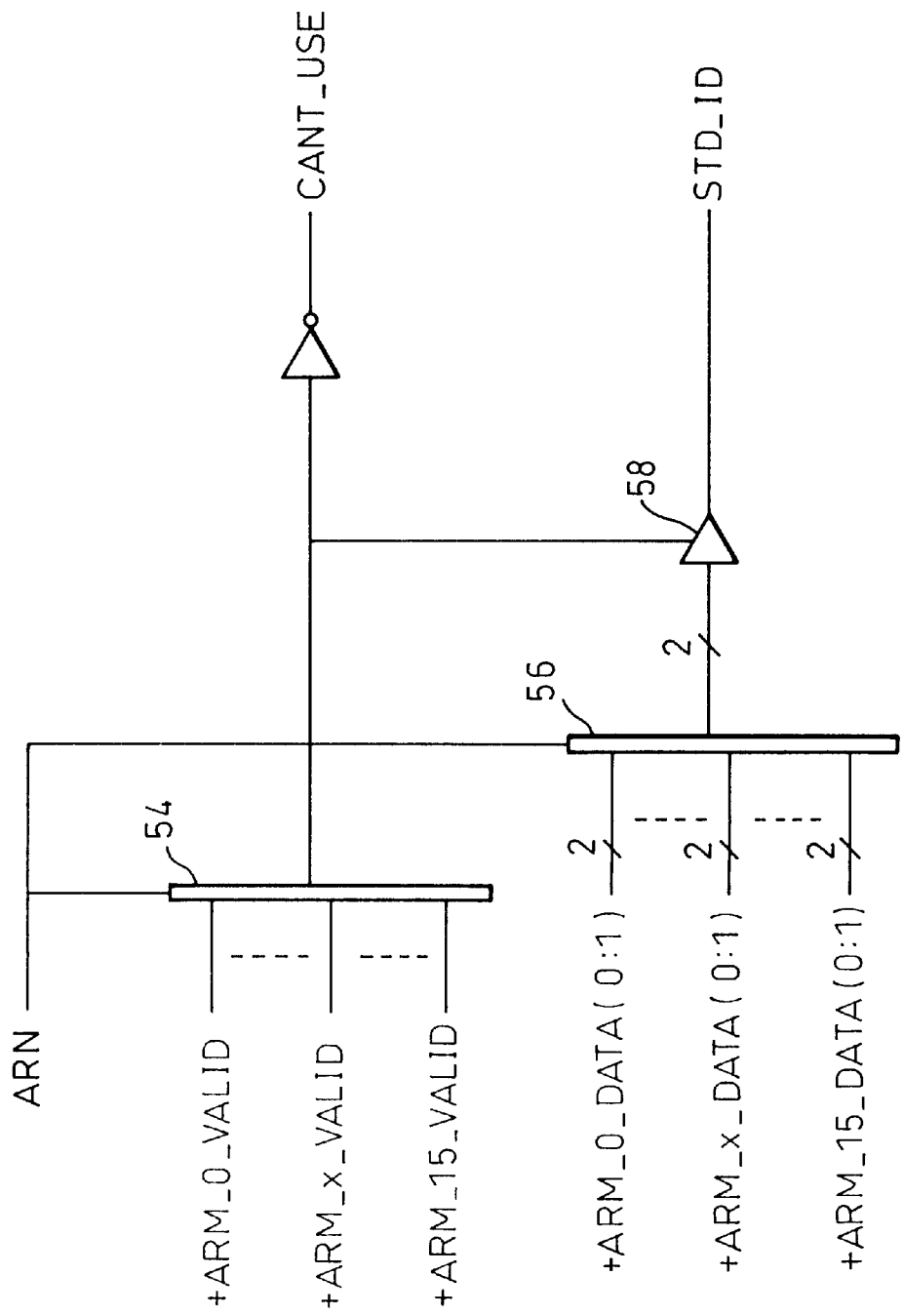
FIG. 11 is a circuit diagram showing an example of a circuit for accessing the AR map.

FIG. 11 shows an example of a circuit which determines an ID of an STD corresponding to an AR designated by using the AR map upon AR access, and supplies the determined ID to the storage controlling part 12. Based on the designated ARN, selector 54 selects and outputs one of those signals +ARM_x_VALID representing valid/invalid of entries to be outputted by the 16 pieces of flip-flops 36, respectively. Similarly, based on the designated ARN, selector 56 selects and outputs one of those signals +ARM_x_DATA (0:1) representing an ID of an STD to be outputted by the 16 pieces of latches 38, respectively. When the +ARM_x_VALID selected by the selector 54 represents "valid", gate 58 is opened so that designation of entry in the STD array is performed. In case of "invalid", a microprogram is started as explained hereinafter.

Figure 12:
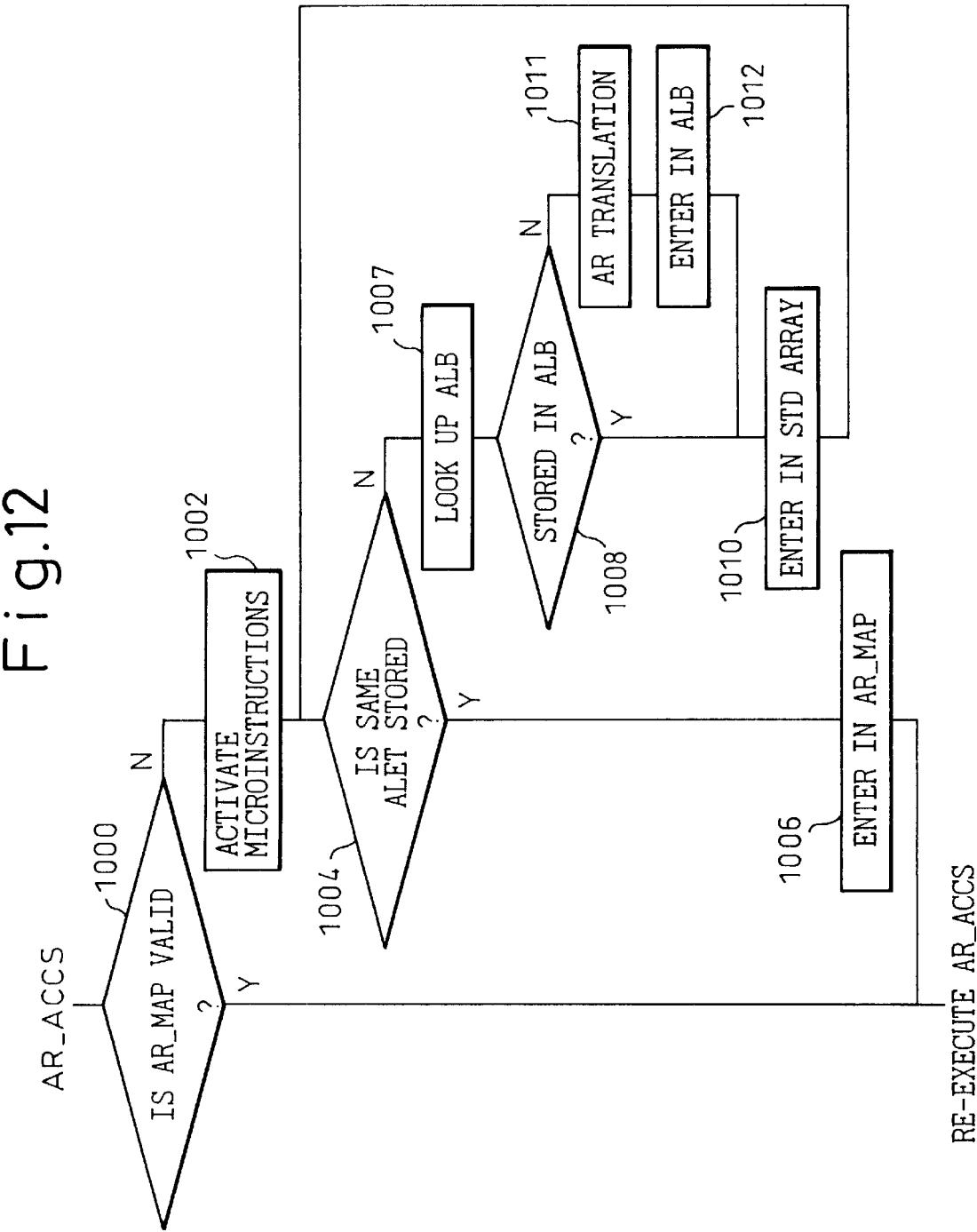
FIG. 12 is a flowchart of a processing of a microprogram to be started when the AR map is invalid.

FIG. 12 is a flowchart of a processing of the microprogram to be started when that entry in the AR map which corresponds to a designated AR is invalid. In FIG. 12, when the AR map is invalid (step 1000) as a result of execution of AR access, there is started a microinstruction (step 1002). Firstly, if it is made clear, by the circuit described with reference to FIG. 5, that an ALET which is equal to an ALET of the designated AR is stored in the ALET holding part (step 1004), the ID of the coinciding ALET is stored into the AR map by the circuit shown in FIG. 6 (step 1006) and the AR access is then executed again. In this case, the AR map must be hit. When an equal ALET is not stored, there is firstly looked up an ALB (not shown) (step 1007). When an entry having an ALET identical with the ALET of the designated AR is stored in the ALB (step 1008), an STD included in the entry is entered into the STD array by the circuit described with reference to FIGS. 3 and 4 (step 1010). Then, there are again performed the processing at the step 1004 and so forth to thereby perform the storing into the AR map, and AR access is thereafter executed again. If an identical ALET is not stored in the ALB at step 1008, AR translation is performed (step 1011), the result thereof is entered into the ALB (step 1012), and the processing flow joins to the step 1010 so as to again perform storing into the STD array, storing into the AR map, and AR access.

Figure 13:
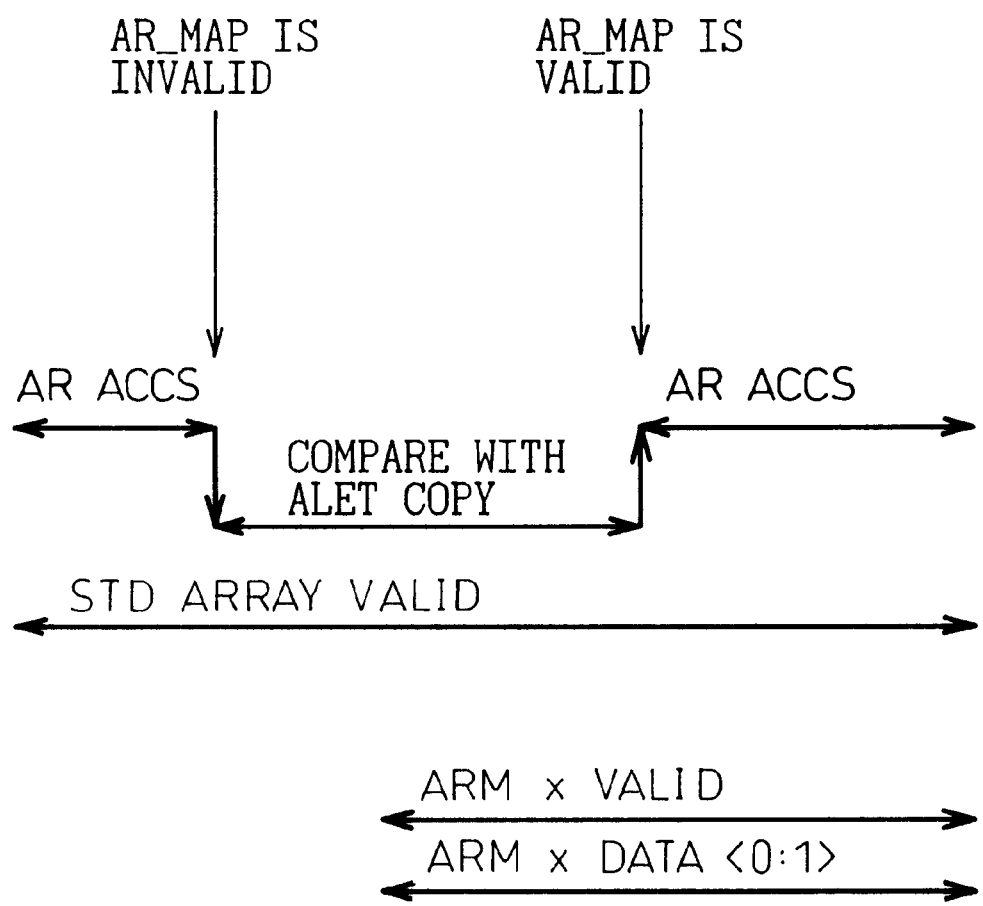
FIG. 13 is a timing diagram of an operation when the AR map is invalid and a necessary STD is entered in the STD array.

FIG. 13 shows a timing diagram of an operation when the AR map is invalid at the time of AR access but an STD corresponding to an ALET is stored in the STD array. In FIG. 13, STD_ARRAY_VALID corresponding to an ALET of a designated AR is in an ON state. When the AR map is invalid, there is performed comparison with a copy of ALET stored in the ALET holding part and a coinciding one exists, so that its ID is entered into the AR map to thereby validate the signals ARM_x_VALID and ARM_x_DATA (0:1) and the AR access is performed again.

Figure 14:
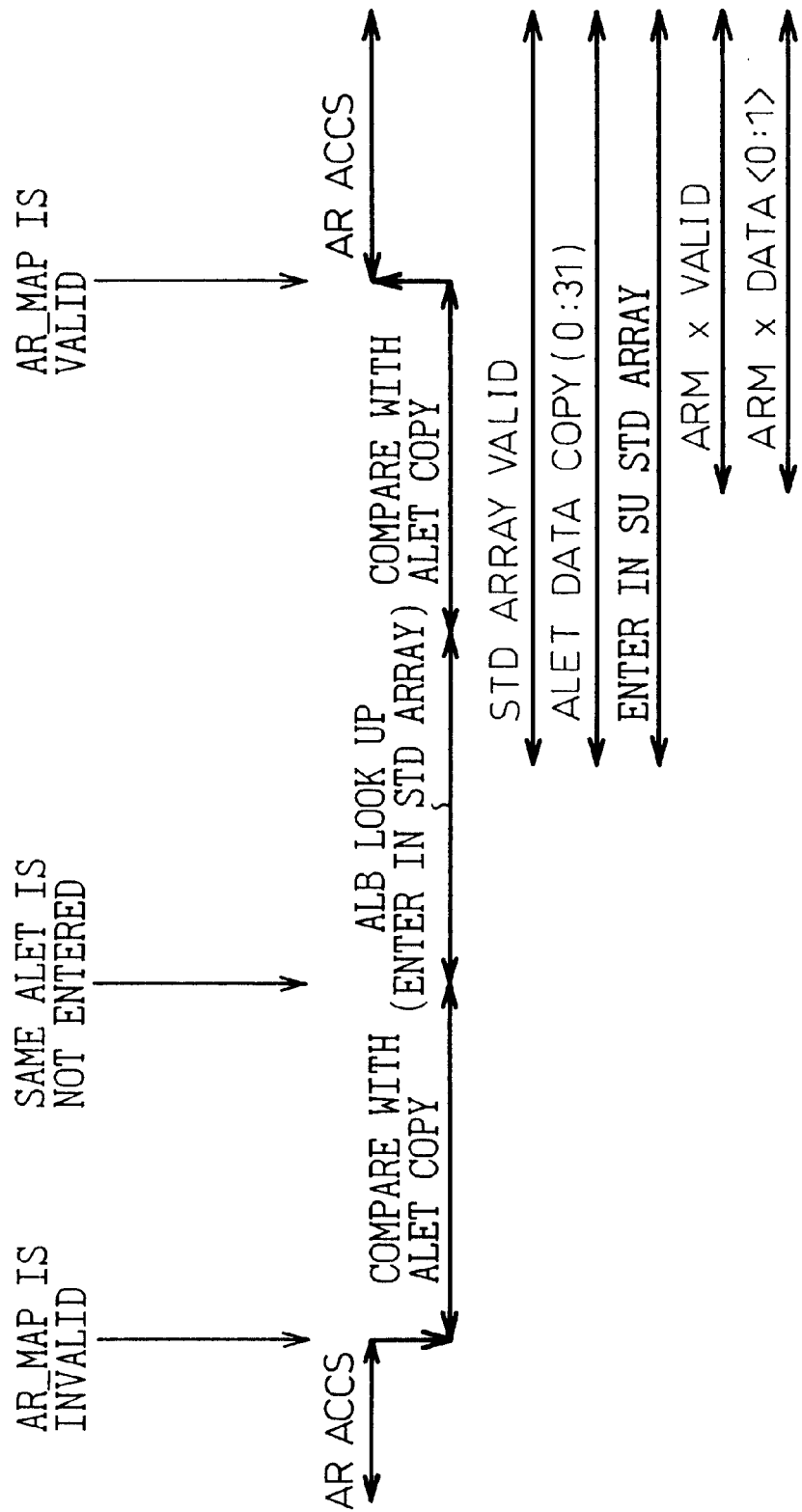
FIG. 14 is a timing diagram of an operation when the AR map is invalid, a necessary STD is entered not in the STD array but is registered in an ALB.

FIG. 14 is a timing diagram of an operation when, at the time of AR access, the AR map is invalid, an identical ALET is not stored,and a desired entry is stored in ALB. In FIG. 14, since an identical ALET is not stored as a result of comparison with a copy of ALET, ALB looking up is performed and retrieved STD and ALET are stored. The processing thereafter is identical with that in FIG. 13.

Figure 15:
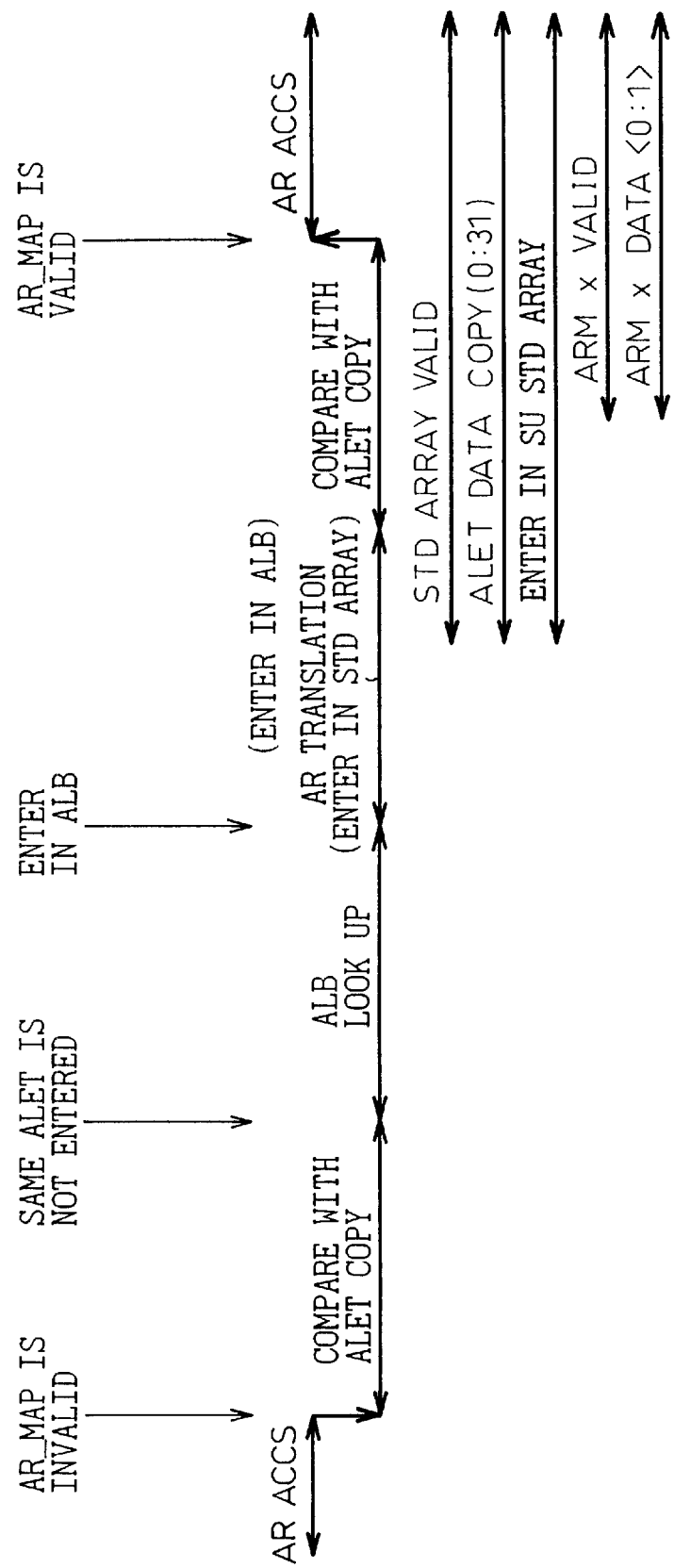
FIG. 15 is a timing diagram of an operation when the AR map is invalid, a necessary STD is not entered in the STD array nor in the ALB.

FIG. 15 is a timing diagram of an operation when the AR map is invalid, and an identical ALET is not stored, in the ALB. When the ALET is not stored also in the ALB, there is performed an AR translation, and its result is stored into the ALB and the STD array. The processing thereafter is identical with that in FIG. 13.

What is claimed is:

1. A virtual storage address space access control method of determining a segment table usable to access the virtual address space, based on a designated access register, said method comprising:
   (a) dynamically storing identifiers indicating correspondences between access registers and segment table designations stored in a segment table designation array, into an access register map; and
   (b) determining a segment table designation which corresponds to a designated access register, making use of the identifiers stored in the access register map.

2. A virtual storage address space access control method of determining a segment table usable to access the virtual address space, based on a designated access register, said method comprising:
   (a) dynamically storing identifiers indicating correspondences between access registers and segment table designations stored in a segment table designation array, into an access register map;
   (b) determining a segment table designation which corresponds to a designated access register, making use of the identifiers stored in the access register map;
   (c) storing copies of access list entry tokens which correspond to respective segment table designations stored in the segment table designation array, wherein the dynamically storing identifiers further comprises:
      (i) comparing an access list entry token of the designated access register with each of the copies of access list entry tokens,
      (ii) storing a segment table designation determined from the access list entry token of the designated access register, in the segment table designation array, when the access list entry token of the designated access register coincides with none of the copies of access list entry tokens, and
      (iii) storing a correspondence between the designated access register and a segment table designation corresponding to a copy of an access list entry token which coincides with the access list entry token of the designated access register, into the access register map.

3. The method of claim 2, wherein the storing a segment table designation further comprises:
   storing segment table designations translated from access list entry tokens into an access register translation lookup buffer, and
   determining the segment table designation to be stored in the segment table designation array, making use of the access register translation lookup buffer.

4. The method of claim 2, further comprising:
   (d) invalidating, in the access register map, all of correspondences concerning a segment table designation which are to be updated by overwriting.

5. The method of claim 4, further comprising:
   (e) invalidating, in the access register map, a correspondence concerning an access register in response to an instruction for updating the access register.

6. The method of claim 5, further comprising:
   (f) preserving the correspondence which is to be invalidated until termination of an execution of the instruction.

7. The method of claim 6, wherein, the correspondence is preserved in a place other than the access register map.

8. A virtual storage address space access control apparatus for determining a segment table usable to access the virtual address space, based on a designated access register, comprising:
   an access register map capable of dynamically storing identifiers indicating correspondences between access registers and segment table designations stored in a segment table designation array; and
   an access control circuit determining a segment table designation which corresponds to a designated access register, making use of the identifiers stored in the access register map.

9. A virtual storage address space access control apparatus determining a segment table usable to access the virtual address space, based on a designated access register, comprising:
   an access register map capable of dynamically storing identifiers indicating correspondences between access registers and segment table designations stored in a segment table designation array;
   an access control circuit determining a segment table designation which corresponds to a designated access register, making use of the identifiers stored in the access register map;
   a memory storing copies of access list entry tokens which correspond to respective segment table designations stored in the segment table designation array; and
   said access control circuit further comprises:
      a comparator comparing an access list entry token of the designated access register with each of the copies of access list entry tokens,
      an STD array control circuit storing a segment table designation determined from the access list entry token of the designated access register, in the segment table designation array, when the access list entry token of the designated access register coincides with none of the copies of access list entry token, and
      an AR map control circuit storing a correspondence between the designated access register and a segment table designation corresponding to a copy of an access list entry token which coincides with the access list entry token of the designated access register, into the access register map.

10. The apparatus of claim 9, wherein said STD array control circuit:
    stores segment table designations translated from access list entry tokens into an access register translation lookup buffer; and
    determines the segment table designation to be stored in the segment table designation array, making use of the access register translation lookup buffer.

11. The apparatus of claim 9, further comprising:
    an AR map invalidating circuit invalidating all of the correspondences concerning a segment table designation which is to be updated by overwriting.

12. The apparatus of claim 11, wherein said AR map invalidating circuit, further, invalidates a correspondence concerning an access register in response to an instruction for updating the access register.

13. The apparatus of claim 12, further comprising:
    a correspondence preserving circuit preserving the correspondence which is to be invalidated until termination of an execution of the instruction.

14. The apparatus of claim 13, wherein:
    said correspondence preserving circuit preserves the correspondence in a place other than the access register map.

* * * * *